United States Patent
Ghoshal

[11] Patent Number: 6,008,705
[45] Date of Patent: Dec. 28, 1999

[54] CROSSTALK SUPPRESSION IN WIDE, HIGH-SPEED BUSES

[75] Inventor: Uttam Shymalindu Ghoshal, Austin, Tex.

[73] Assignee: International Business Machines Corporation, Armonk, N.Y.

[21] Appl. No.: 09/030,880

[22] Filed: Feb. 26, 1998

[51] Int. Cl.[6] ....................................... H04B 3/32
[52] U.S. Cl. ................... 333/1; 327/551; 333/12
[58] Field of Search ............................ 333/1, 12; 174/32; 327/311, 551

[56] References Cited

U.S. PATENT DOCUMENTS

| | | | |
|---|---|---|---|
| 3,681,612 | 8/1972 | Vogl et al. | 333/12 X |
| 5,027,088 | 6/1991 | Shimizu et al. | 333/1 |
| 5,815,031 | 9/1998 | Tan et al. | 327/551 |

Primary Examiner—Paul Gensler
Attorney, Agent, or Firm—Casimer K. Salys; Jack V. Musgrove; Andrew J. Dillon

[57] ABSTRACT

A data transmission system generally comprising a bus with transmission lines, and a signal driver that applies a first signal to a first one of the transmission lines, and applies one or more signals to at least one other of the transmission lines which is adjacent the first transmission line, wherein the second signal has an amplitude proportional to an amplitude of the first signal such that crosstalk between the first and second transmission lines is substantially reduced. The signal driver may take the form of a current mode driver, which provides the compensating (second) signal with a current which is k/c times smaller than the current of the first signal, wherein k is the mutual capacitance between the first and second transmission lines, and c is the capacitance between either of the first or second transmission lines and a ground plane. If the first and second transmission lines are orthogonal, the current mode driver preferably includes differential input lines. The suppression scheme can easily be extended to bidirectional and broadcast buses.

17 Claims, 4 Drawing Sheets

$y_{ij} = vC_{ij}$

CROSSTALK SUPPRESSION IN WIDE, HIGH-SPEED BUSES

BACKGROUND OF THE INVENTION

1. Field of the Invention

The present invention generally relates to electronic data transmission systems, and more specifically to a method of suppressing crosstalk in wide, high-speed buses, particularly buses such as those used in and between various components of computer systems, and further to novel transmission circuits which implement the crosstalk suppression.

2. Description of Related Art

Modern electronic circuits use many different types of logic components (processing units) to carry out numerous functions. These circuits require a multitude of conductive pathways to provide communications or connectivity between the logic components. Many components require a group or set of conductors (wires), referred to as a bus, which interconnect a plurality of related output lines of one device to a respective plurality of input lines of another device, often in a parallel fashion. Buses are most advantageously used to interconnect three or more devices, and allow simultaneous or sequential access to information conveyed on the bus. These buses may be external, e.g., laid out on a printed circuit board, and interconnecting two or more devices which are separately packaged. They may also be internal, interconnecting two or more devices which are fabricated in a single package, such as an integrated circuit (IC). In the latter implementation, a bus line may be so small (narrow) as to be hardly visible to the naked eye.

Buses are used to interconnect devices for a wide variety of applications, including communications between complex computer components such as microprocessors, application specific integrated circuits (ASICs), peripheral devices, random-access memory, etc. Operational demands on high-speed buses for computer systems have especially increased with the advent of larger bus widths. For example, early computer processors used 8-bit operation (8-bit registers and execution units) and consequently required an 8-line bus. Just in the past few years, however, data bus requirements for IC chips and microprocessors have gone from 16, to 32, to 64, and to 128 lines. The most recent advances are directed to 256-line buses.

With the increasing complexity of microprocessor circuits and their associated bus requirements, and further considering the ongoing miniaturization of integrated circuits, the physical constraints on data bus widths present several difficulties. One problem is electromagnetic interference (i.e., coupling effects) between parallel conductors. Each conductor exhibits a capacitance with respect to its immediately adjacent line(s), as well as with respect to more distant lines. Excessive interference between neighboring conductors can result in "crosstalk," wherein a data signal from one or more lines interferes with the signal on a nearby line, i.e., changes the voltage on the line sufficiently to cause a bit error. Crosstalk problems can also arise with orthogonal lines, as well as bidirectional and broadcast buses. This problem is particularly exacerbated with high-speed buses (e.g., those operating at frequencies around 100 MHz or more, and especially above 1 GHz), and can result in undetectable, sporadic errors. Crosstalk can additionally occur between lines from adjacent buses, e.g., in a multi-layer circuit.

Trends accordingly indicate that the data bus will become a data processing bottleneck in the near future, by which it is meant that the IC or microprocessor will be able to process, present and receive parallel data faster than the available data buses can reliably transmit the data. There are other methods of reducing crosstalk, which would allow increased bus speed, but all of these have significant limitations or disadvantages. For example, the physical spacing between immediately adjacent bus lines can be increased, to lower the mutual capacitances, but this approach has deleterious consequences on miniaturization. It would, therefore, be desirable to devise an improved method of suppressing crosstalk in a data transmission bus, so as to allow higher operation speeds for the bus. It would be further advantageous if the method of improved crosstalk suppression were able to maintain a low interconnection delay.

SUMMARY OF THE INVENTION

It is therefore one object of the present invention to provide an improved data transmission circuit.

It is another object of the present invention to provide a bus for such a circuit having a design which substantially suppresses crosstalk between lines in the bus, and particularly allows higher bus speeds without excessive bit errors.

It is yet another object of the present invention to provide a method of crosstalk suppression for a data bus, which reduces the interconnection delay.

The foregoing objects are achieved in a data transmission system generally comprising a plurality of transmission lines each having a source end and a load end, and means for applying a first signal to a first one of the transmission lines, and applying a second signal to a second one of the transmission lines which is adjacent the first transmission line, wherein the second signal has an amplitude proportional to an amplitude of the first signal such that crosstalk between the first and second transmission lines is substantially reduced. The invention can be applied to a data transmission system wherein the second transmission line is immediately adjacent the first transmission line, and wherein the applying means further applies a third signal to a third transmission line which is also immediately adjacent the first transmission line (the third signal is substantially identical to the second signal). If the first and second transmission lines are orthogonal, the applying means preferably includes differential input lines. The applying means may take the form of a current mode driver, which provides the second and third signals with a current which is k/c times smaller than the current of the first signal, wherein k is the mutual capacitance between the first and second transmission lines, and c is the capacitance between either of the first or second transmission lines and a ground plane.

This design has nominal complexity, and there is no increase in the number of input/output lines if the invention is applied to external buses. The suppression scheme can easily be extended to bidirectional and broadcast buses.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
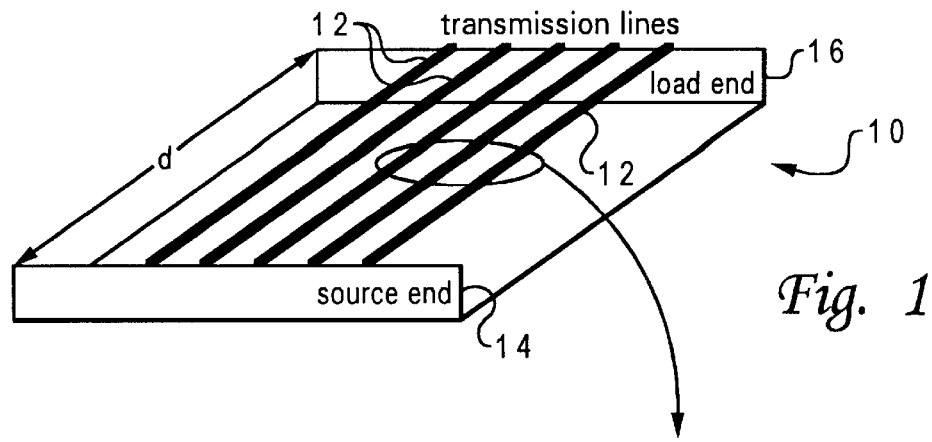
FIG. 1 is a pictorial representation of a communications bus having a plurality of transmission lines which convey data signals from a source end to a load end of the bus, constructed in accordance with one embodiment of the present invention.

With reference now to the figures, and in particular with reference to FIG. 1, there is shown a pictorial representation of one embodiment 10 of a communications bus for a data transmission circuit constructed in accordance with the present invention, and comprising a plurality of transmission lines 12 which convey data signals from a source end 14 to a load end 16 of the bus. The physical geometry and size of the bus may vary according to the desired application. Those skilled in the art will appreciate upon reading the following disclosure that the invention is useful for both on-chip and off-chip communications.

Figure 2A:
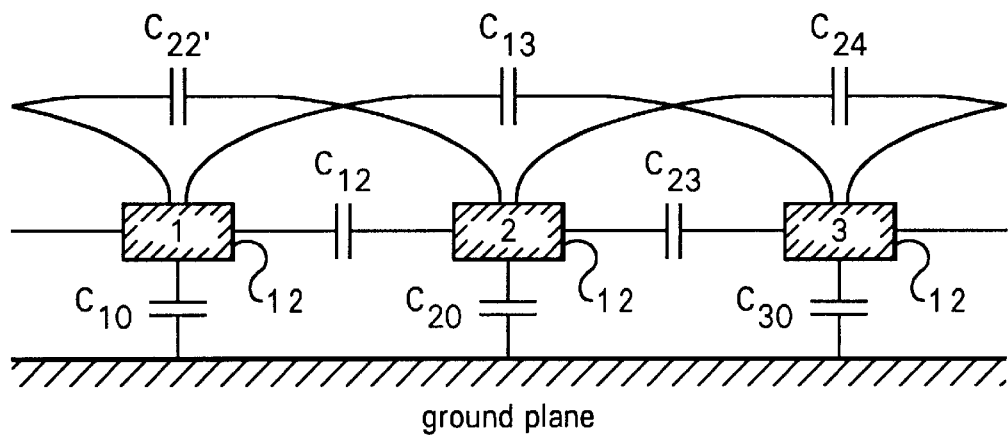
FIG. 2A is a schematic diagram of the bus of FIG. 1, illustrating capacitive coupling effects.

As further illustrated in FIG. 2A, capacitive coupling occurs between the lines and the ground plane (capacitances $C_{10}$, $C_{20}$, $C_{30}$, etc.), between immediately adjacent lines (capacitances $C_{12}$, $C_{23}$, etc.), and between a given line and a nearby adjacent line which is not contiguous (capacitances $C_{22}$, $C_{13}$, $C_{24}$, etc.). Although FIG. 2A depicts these capacitances as connections between the lines, it is understood that they are not directly connected, but rather that the effective capacitances arise simply as a result of the proximity of the lines to each other (and to the ground plane). Capacitive coupling also occurs between a given line and more distant lines, but these capacitances are much less significant and are not discussed further herein.

Figure 2B:
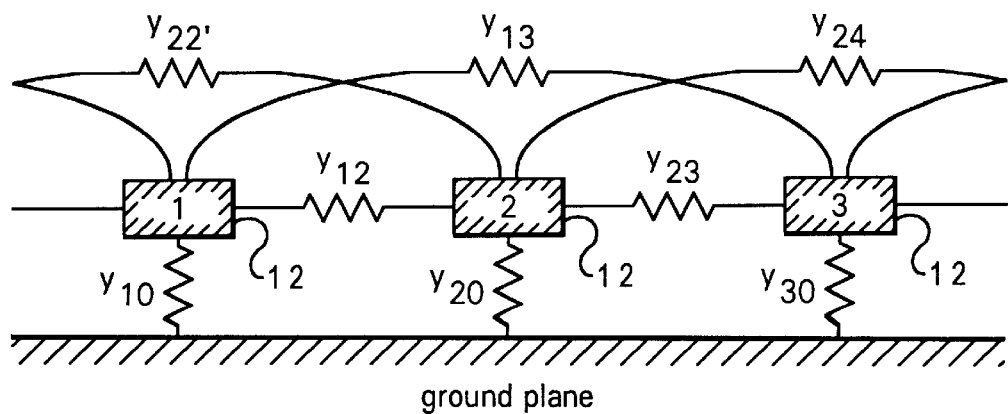
FIG. 2B is a schematic diagram of the bus of FIG. 1 further illustrating mutual conductances of the transmission lines.

The transmission lines are terminated at the load end of the lines with a matching network constructed of MOS transistors. The conductances of the network are shown in FIG. 2B, including a conductance relative to the ground plane (conductances $y_{10}$, $y_{20}$, $y_{30}$, etc.), relative to an immediately adjacent line (conductances $y_{12}$, $y_{23}$, etc.), and relative to a nearby adjacent line which is not contiguous (conductances $y_{22}$, $y_{13}$, $y_{24}$, etc.). Conductances may also be established between a given line and more distant lines, but these conductances would likewise be much less significant and not discussed further herein.

Figure 3:
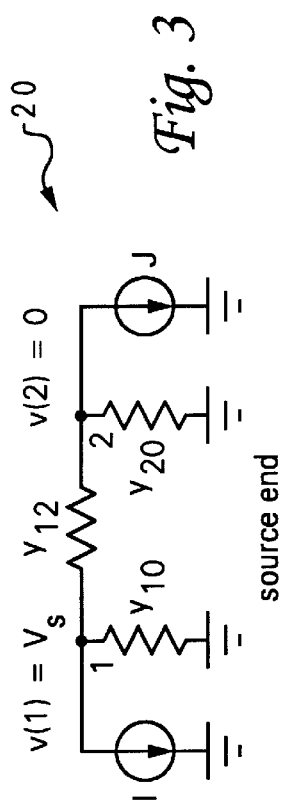
FIG. 3 is a schematic diagram of a simplified, two-line bus constructed in accordance with the present invention, illustrating mutual conductances and currents.

The matching impedance network may be understood by first considering the simplest embodiment of the present invention, a two-line network 20 as shown in FIG. 3. When the coupled system is terminated by a matching impedance at the load end, the system poses a pure conductance network at the driver end. If a first voltage of $V_S$ is impressed on the first line, and a zero voltage is impressed on the second line, then the currents I and J driving the first and second lines, respectively, can be expressed as $$\begin{bmatrix} I \\ J \end{bmatrix} = \begin{bmatrix} y_{10} & -y_{12} \\ -y_{12} & y_{20} \end{bmatrix} \begin{bmatrix} V_s \\ 0 \end{bmatrix} \quad \text{(equation 1)}$$

According to single transmission line theory, the conductance of a load can be expressed as $$y = (CL^{-1})^{-\frac{1}{2}} = vC$$

where C is the capacitance of the load, L is its inductance, and $v = (LC)^{-\frac{1}{2}}$, using the transverse electromagnetic (TEM) approximation. Therefore, if it is assumed that $y_{10} = y_{20}$, equation 1 can be rewritten as $$\begin{bmatrix} I \\ J \end{bmatrix} = v \begin{bmatrix} c & -k \\ -k & c \end{bmatrix} \begin{bmatrix} V_s \\ 0 \end{bmatrix} \quad \text{(equation 2)}$$

Where c is the capacitance of a given line with respect to ground, and k is the mutual capacitance.

Now consider the larger network 10, and the hypothetical state wherein only one line (the mth line) is active. If this line is again driven by a current I and its neighboring lines (m−1 and m+1) are driven by a current J, then equation 2 expands to $$\begin{bmatrix} 0 \\ \cdots \\ 0 \\ J \\ I \\ J \\ 0 \\ \cdots \\ 0 \end{bmatrix} = v \begin{bmatrix} \cdots & \cdots & \cdots & \cdots & \cdots & \cdots & \cdots \\ \cdots & c & -k & 0 & \cdots & \cdots & \cdots \\ 0 & -k & c & -k & 0 & \cdots & \cdots \\ \cdots & 0 & -k & c & -k & 0 & \cdots \\ \cdots & \cdots & 0 & -k & c & -k & 0 \\ \cdots & \cdots & \cdots & 0 & -k & c & \cdots \\ \cdots & \cdots & \cdots & \cdots & \cdots & \cdots & \cdots \end{bmatrix} \begin{bmatrix} 0 \\ \cdots \\ 0 \\ 0 \\ V_s \\ 0 \\ 0 \\ \cdots \\ 0 \end{bmatrix}$$

By superposition of other drive currents, it can be concluded that if the coupled system is terminated properly, and if each driver drives its neighboring line by a compensating current that is equal to −k/c multiplied by the signal current, then the net crosstalk voltages will be approximately zero.

Figure 4:
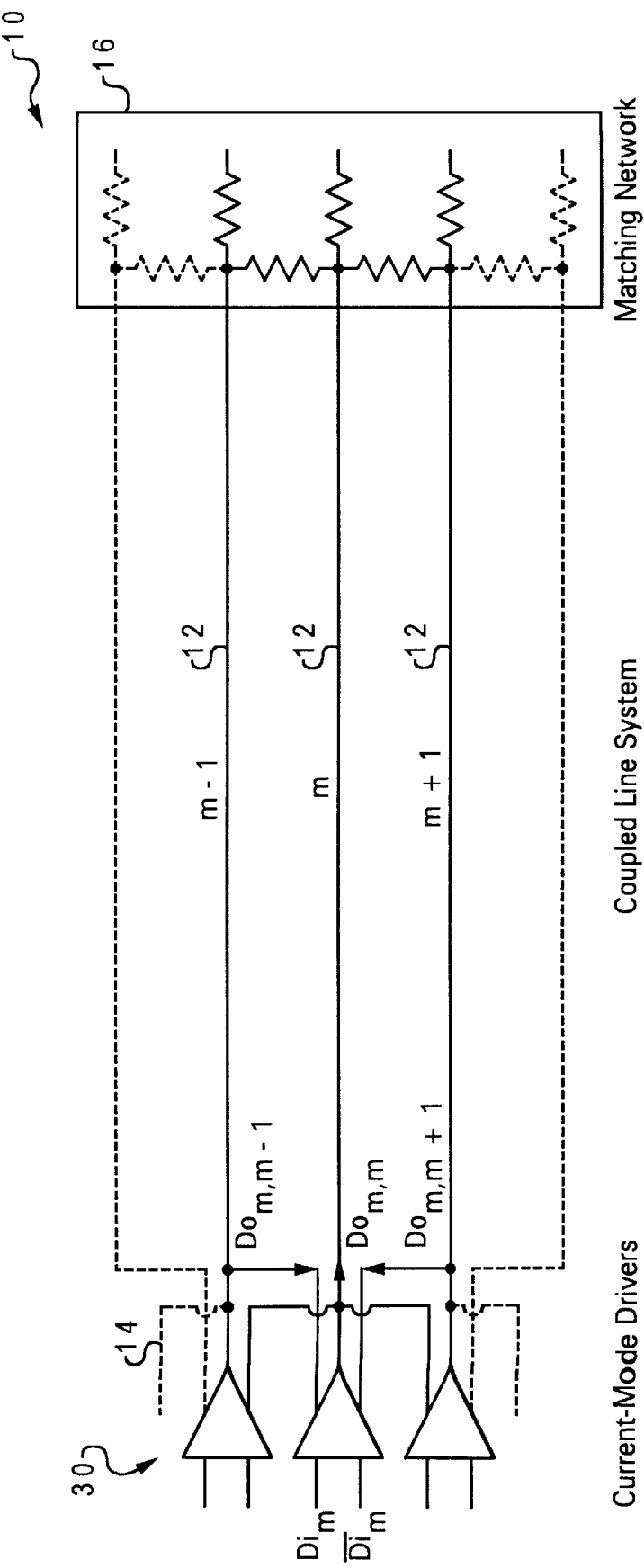
FIG. 4 is a high-level schematic diagram of one implementation for suppressing crosstalk in accordance with the present invention.
Figure 5:
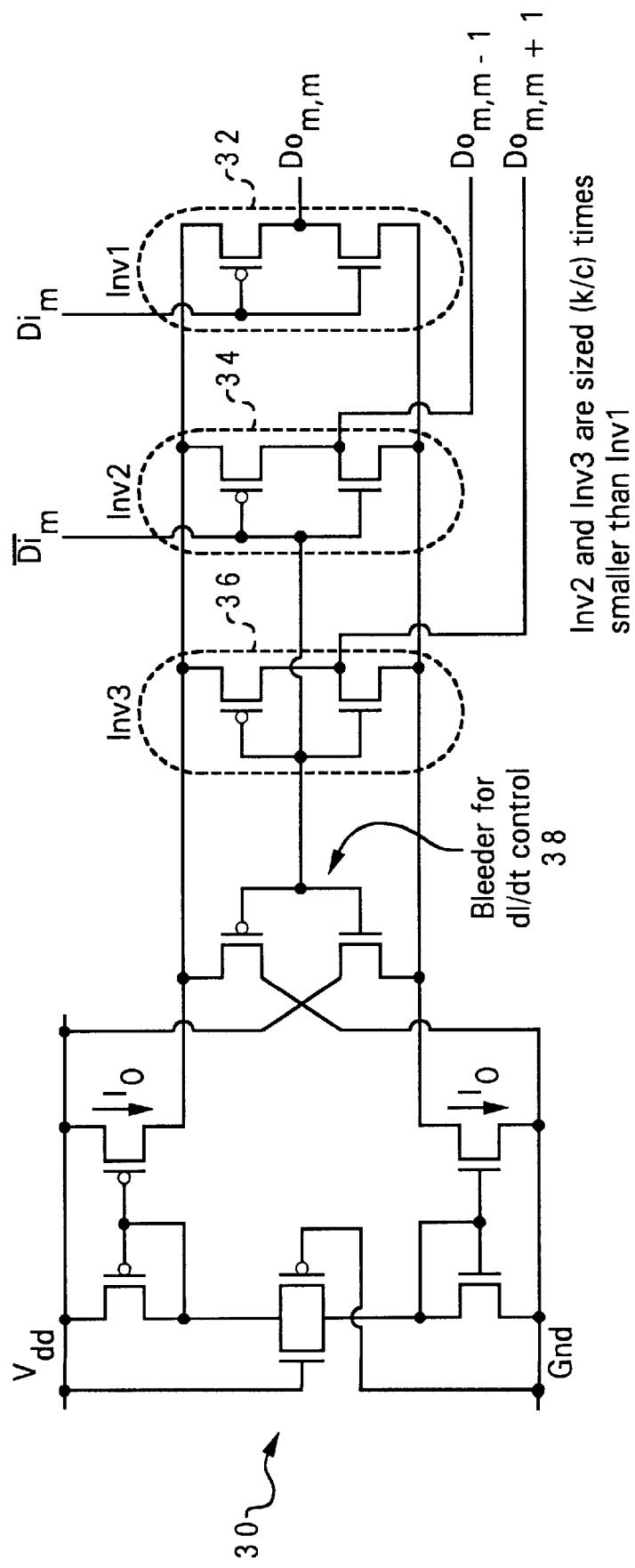
FIG. 5 is low-level schematic diagram of the implementation of FIG. 4.

One method for implementing the foregoing is illustrated in FIG. 4. Current mode drivers 30 are coupled to neighboring lines to provide the multiplying factor. One embodiment of the coupled current mode driver 30 is shown in FIG. 5. The signal $Do_{m,m}$ is provided by a first inverter 32 which is sized c/k times larger than the two inverters 34 and 36 which respectively provide the coupling signals $Do_{m,m-1}$ and $Do_{m,m+1}$. Each current mode driver 30 uses a differential input with signal $Di_m$ being connected to inverter 32, and signal $\overline{Di_m}$ being connected to inverters 34 and 36. The latter signal is also connected to a bleeder 38 for dI/dt control. By driving adjacent lines with the appropriately proportional currents, the overall crosstalk of the bus is significantly reduced.

Figure 6:
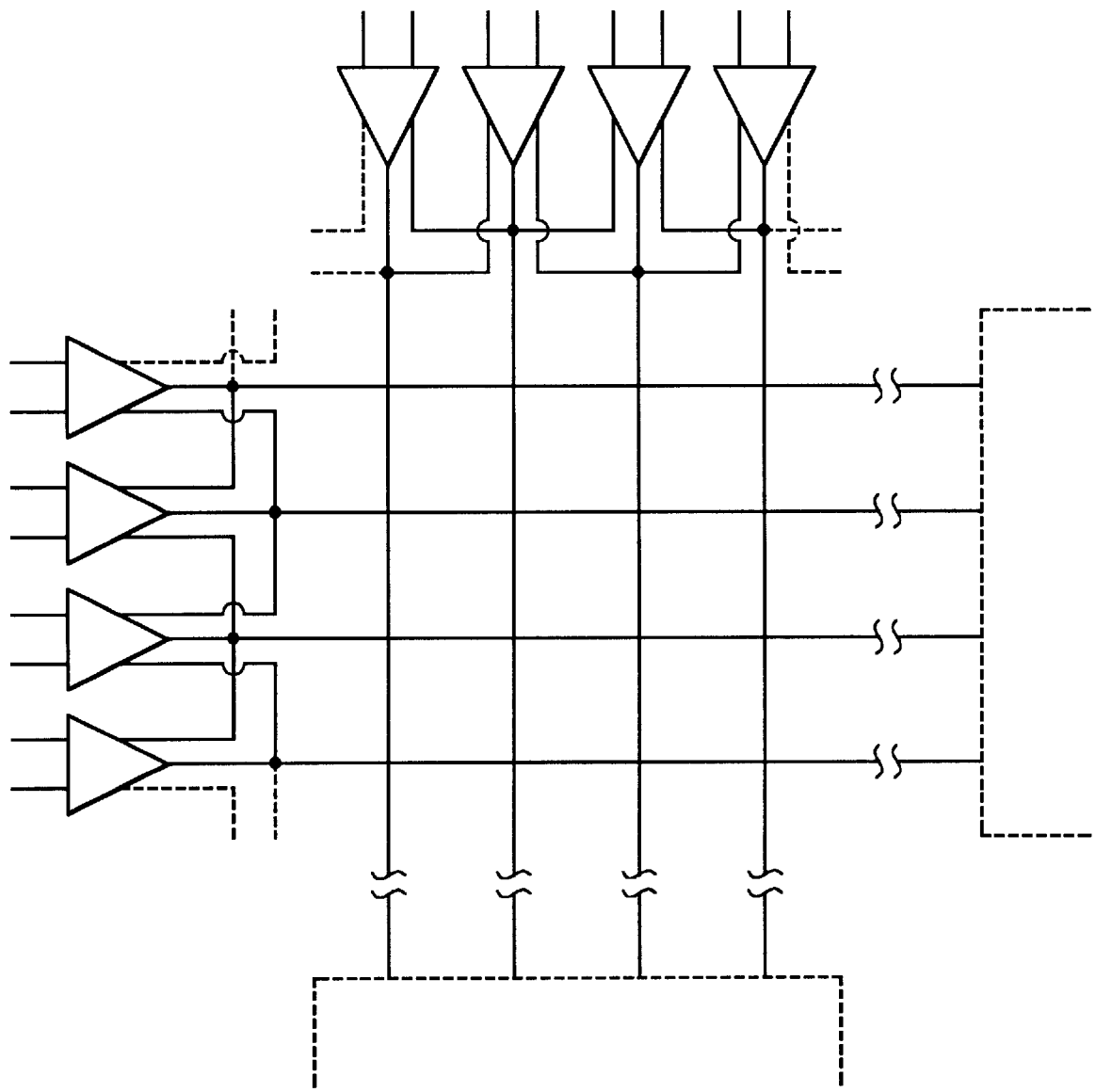
FIG. 6 is a high-level schematic diagram depicting one implementation of the present invention for suppressing crosstalk in orthogonal transmission lines.

This design has nominal complexity, and there is no increase in the number of input/output lines if the invention is applied to external buses. Crosstalk in orthogonal lines is best suppressed by using differential input lines as depicted in FIG. 6. The suppression scheme can easily be extended to bidirectional and broadcast buses.

The above crosstalk suppression method can be easily extended to distortion-less, lossy lines typical of internal (on-chip) buses. For general RLGC lines, the propagation constant gamma ($\Gamma$) is equal to $[(R+sL)(G+sC)]^{1/2}$, and the characteristic impedance Z is equal to $[(R+sL)(G+sC)^{-1}]^{+e}$, fra 1/+ee. Transistor-based conductances G can be constructed such that $RL^{-1} = GC^{-1}$, and the load matching conductances remain the same. The condition for crosstalk suppression is modified to account for the modal attenuations. The inverters in the driver circuits are preferably resized to incorporate a slightly different ratio of signal current (I) to the near-neighbor current (J), using v[exp (RYl)] instead of v, where Y=vC, and l is the length of the transmission lines. For a two-line problem, the ratios of the currents (m versus m−1 and m+1) is given by $$\frac{J}{I} = \frac{[\exp((rv_0(c+k)l)) - \exp(rv_0(c-k)l))]c - [\exp((rv_0(c+k)l)) + \exp(rv_0(c-k)l))]k}{[\exp((rv_0(c+k)l)) + \exp(rv_0(c-k)l))]c - [\exp((rv_0(c+k)l)) - \exp(rv_0(c-k)l))]k}$$

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A method of reducing crosstalk in a bus having a plurality of transmission lines, comprising the steps of:
    applying a first signal to a first transmission line; and
    applying a second signal to a second transmission line adjacent the first transmission line, wherein the second signal has an amplitude selected to compensate for coupling effects generated in the second transmission line by the first signal, such that a net crosstalk voltage on the second transmission line is approximately zero.

2. The method of claim 1 wherein said step of applying the second signal is accomplished by applying the second signal to a transmission line which is immediately adjacent the first transmission line.

3. The method of claim 1 wherein the first transmission line and the second transmission line are generally orthogonal, and said step of applying the second signal includes the step of providing differential lines.

4. The method of claim 1 wherein said applying steps are carried out by applying the first and second signals using a current mode driver.

5. The method of claim 1 wherein the bus has at least three transmission lines, including the first transmission line, the second transmission line, and a third transmission line, and further comprising the step of applying a third signal to the third transmission line, wherein the third signal is substantially identical to the second signal.

6. The method of claim 4 wherein said applying steps further include the step of applying the second signal with an amplitude of k/c times smaller than an amplitude of the first signal, wherein k is the mutual capacitance between the first and second transmission lines, and c is the capacitance between either of the first or second transmission lines and a ground plane.

7. The method of claim 5 wherein the second and third signals have an amplitude proportional to an amplitude of the first signal such that crosstalk between the first and second transmission lines, and between the first and third transmission lines, is substantially reduced.

8. The method of claim 7 wherein said applying steps further include the step of applying the second and third signals with an amplitude of k/c times smaller than the amplitude of the first signal, wherein k is the mutual capacitance between the first and second transmission lines, and between the first and third transmission lines, and c is the capacitance between any of the first, second or third transmission lines and a ground plane.

9. A data transmission system comprising:
    a plurality of transmission lines each having a source end and a load end; and
    means for applying a first signal to a first one of said transmission lines, and applying a second signal to a second one of said transmission lines which is adjacent said first transmission line, wherein said second signal has an amplitude selected to compensate for coupling effects generated in said second transmission line by said first signal, such that a net crosstalk voltage on said second transmission line is approximately zero.

10. The data transmission system of claim 9 wherein said second transmission line is immediately adjacent said first transmission line.

11. The data transmission system of claim 9 wherein said first and second transmission lines are generally orthogonal, and said applying means includes differential input lines.

12. The data transmission system of claim 10 wherein said applying means includes a current mode driver.

13. The data transmission system of claim 10 wherein said applying means is further for applying a third signal to a third one of said transmission lines, wherein the third signal is substantially identical to the second signal.

14. The data transmission system of claim 10 wherein said applying means further includes means for applying the second signal with an amplitude of k/c times smaller than an amplitude of the first signal, wherein k is the mutual capacitance between said first and second transmission lines, and c is the capacitance between either of said first or second transmission lines and a ground plane.

15. The data transmission system of claim 10 wherein the second and third signals have an amplitude proportional to an amplitude of the first signal such that crosstalk between said first and second transmission lines, and between the first and third transmission lines, is substantially reduced.

16. The data transmission system of claim 10 wherein said applying means includes a first inverter providing an output for the first signal, and a second inverter providing an output for the second signal.

17. The data transmission system of claim 13 wherein said applying means includes means for applying the second and third signals with an amplitude of k/c times smaller than the amplitude of the first signal, wherein k is the mutual capacitance between said first and second transmission lines, and between said first and third transmission lines, and c is the capacitance between any of said first, second or third transmission lines and a ground plane.

* * * * *